(12) United States Patent
Shilane et al.

(10) Patent No.: US 9,430,156 B1
(45) Date of Patent: Aug. 30, 2016

(54) METHOD TO INCREASE RANDOM I/O PERFORMANCE WITH LOW MEMORY OVERHEADS

(71) Applicant: EMC Corporation, Hopkinton, MA (US)

(72) Inventors: Philip Shilane, Yardley, PA (US); Grant Wallace, Pennington, NJ (US); Frederick Douglis, Basking Ridge, NJ (US)

(73) Assignee: EMC Corporation, Hopkinton, MA (US)

( * ) Notice: Subject to any disclaimer, the term of this patent is extended or adjusted under 35 U.S.C. 154(b) by 272 days.

(21) Appl. No.: 14/303,402

(22) Filed: Jun. 12, 2014

(51) Int. Cl.
*G06F 15/167* (2006.01)
*G06F 3/06* (2006.01)

(52) U.S. Cl.
CPC ............. *G06F 3/0611* (2013.01); *G06F 3/067* (2013.01); *G06F 3/0641* (2013.01)

(58) Field of Classification Search
None
See application file for complete search history.

(56) References Cited

U.S. PATENT DOCUMENTS

| | | | | |
|---|---|---|---|---|
| 8,370,567 | B1* | 2/2013 | Bonwick | G06F 3/0688 711/103 |
| 2006/0271540 | A1* | 11/2006 | Williams | G06F 17/30067 |
| 2006/0282457 | A1* | 12/2006 | Williams | H03M 7/30 |
| 2007/0192548 | A1* | 8/2007 | Williams | G06F 17/30153 711/154 |
| 2010/0083003 | A1* | 4/2010 | Spackman | G06F 21/6209 713/193 |
| 2011/0016088 | A1* | 1/2011 | Spackman | G06F 11/3428 707/637 |
| 2011/0045859 | A1* | 2/2011 | Moulsley | H04L 5/0051 455/507 |
| 2011/0093664 | A1* | 4/2011 | Leppard | G06F 3/061 711/154 |
| 2011/0238635 | A1* | 9/2011 | Leppard | G06F 17/30159 707/693 |
| 2011/0289281 | A1* | 11/2011 | Spackman | G06F 12/0223 711/154 |
| 2012/0233135 | A1* | 9/2012 | Tofano | G06F 17/30489 707/692 |
| 2013/0148227 | A1* | 6/2013 | Tofano | G06F 3/0608 360/48 |
| 2013/0151756 | A1* | 6/2013 | Tofano | G06F 3/0679 711/103 |

* cited by examiner

*Primary Examiner* — Brian P Whipple
(74) *Attorney, Agent, or Firm* — Blakely, Sokoloff, Taylor & Zafman LLP

(57) ABSTRACT

In response to a request for stored data, retrieving an index entry, based on an identifier of the requested data, corresponding to an indexed block of storage containing the requested data. The index entry includes a start location of an indexed storage block and sub-block locators that identify the start of one or more sub-blocks within the indexed storage block. The sub-block containing the requested data is determined and the corresponding sub-block locator is read to find the starting location of the sub-block. Without reading the entire indexed storage block, the sub-block may be read from the starting location of the sub-block, decompressed, and the decompressed requested data read from the sub-block may be transmitted to the client. In this way, fewer I/O operations are needed that read the requested data, and memory needed for storing index information is minimized.

22 Claims, 13 Drawing Sheets

METHOD TO INCREASE RANDOM I/O PERFORMANCE WITH LOW MEMORY OVERHEADS

FIELD OF THE INVENTION

Embodiments of the present invention relate generally to data storage systems. More particularly, embodiments of the invention relate to increasing Input/Output Operations per Second (IOPS) and lowering latency of a cache or storage system while minimizing memory requirements.

BACKGROUND

In a cache or storage system, a memory index may map from some logical address to a physical location indicating where blocks of data reside in the cache or storage system. This index may require a record (index entry) in memory for each block stored. When compression is used to reduce the storage space occupied by blocks of data, the number of blocks which can be stored increases, and thus also increases memory requirements for indexing, because each cached block is referenced from the in-memory index. Using larger blocks reduces the memory requirements (fewer items to index), but if the client requests to read smaller data units (i.e., much smaller than the indexed larger blocks), the entire large block must be read into memory and decompressed, which lowers I/O's per second (IOPS) and increases latency. As an example, consider indexing large blocks, such as 32 KB, to reduce index memory requirements, while the client may want to access random 4 KB sub-blocks. In such a scenario, the full 32 KB block needs to be read and decompressed for each random 4 KB read, thus reducing potential read performance.

An approach when using 32 KB blocks is to compress the entire 32 KB block (perhaps down to ~16 KB), insert the block into a cache or storage, and add an entry to the memory-resident index representing the cached/stored block. Due to the nature of how data is compressed, usually it is not possible to start reading in the middle of compressed data. In other words, bytes in the middle of a compressed block are not randomly accessible. For that reason, when a client attempts to read a 4 KB sub-block contained within an indexed and compressed 32 KB stored data block, the entire compressed 32 KB block (~16 KB after compression) needs to be read and decompressed in order to identify and return the requested 4 KB sub-block. A Solid State Device (SSD) interface often supports reads at 4 KB granularity, so reading the compressed 32 KB block (~16 KB after compression) requires about 4 read operations. In general, when indexing a stored data block that is larger than the size of a single data read operation by the storage interface, multiple read operations are necessary (even if the requested data size could be returned in a single SSD read). Having to perform multiple reads (e.g., 4 reads of 4 KB each) to retrieve much smaller requested data (4 KB) results in longer latency and correspondingly fewer IOPS. A similar problem exists in hard drive systems if compressed data is larger than a rotational track, which is kilobytes in size.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

An embodiment of the invention presents a technique to increase Input/Output Operations per Second (IOPS) and lower latency of a cache or storage system while minimizing memory requirements to track compressed blocks. Larger data blocks are indexed to minimize the number of index entries needed, and thus to minimize the size that the index occupies in memory. The technique described herein involves dividing each of the large indexed blocks into smaller sub-blocks. In an embodiment, a sub-block may be the same size as the requested data. For example, if file Manager requests to read a 4 KB block, a large 32 KB block may be divided into 8 4 KB sub-blocks. A sub-block may be compressed independently from the other sub-blocks into a compressed sub-block (typically compression will reduce the stored block size in half). The compressed blocks may be appended together to form a large compressed block, and the address of the large compressed block is added to the index entry. However, additional information for locating the offsets of the sub-blocks may be added to each index entry. Adding offset information for multiple sub-blocks into an existing index entry requires less memory than creating a complete, standalone index entry for each sub-block. For example, index entry information may include the starting location of the large indexed block and other optional information about the block (e.g., the storage device, sub-block sizes, and storage unit alignment). To associate this information with every sub-block, the information would have to be stored in each independent sub-block index entry. Instead, the index entry for the large block may store this information once and a byte offset from the start of the indexed large block may be stored in the index entry for each of the sub-blocks.

Figure 1:
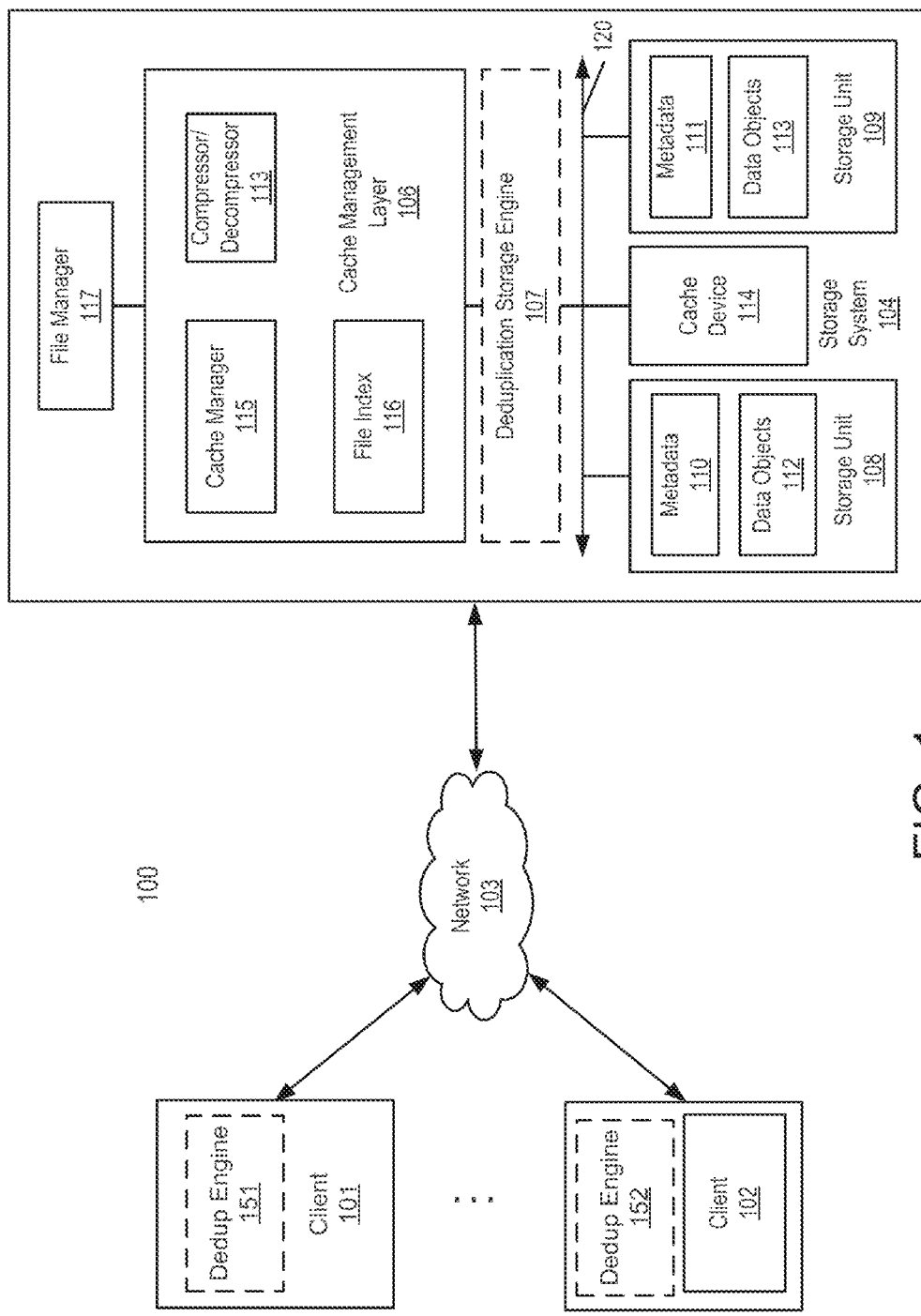
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more Client Systems 101-102 communicatively coupled to Storage System 104 over Network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of Clients 101-102 may be a primary storage system that provides storage to other local clients, which may periodically back up the content stored therein to a backup storage system, such as Storage System 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage System 104 may be located in proximity to one, both, or neither of Clients 101-102.

Storage System 104 may include any type of server or cluster of servers. For example, Storage System 104 may be a storage server used for any of various different purposes, such as to provide multiple users with access to shared data and/or to back up data (e.g., mission critical data). A File Manager 117 requests reads and writes blocks of data to/from files in the storage system. In one embodiment, components in the Cache Management Layer 106 of Storage System 104 includes, but is not limited to, comprising Cache Manager 115, File Index 116, and Compressor/Decompressor 113. File Index 116 is an index of blocks of data stored within the Storage System 104, Cache Manager 115 manages the contents of the cache, including loading into and ejecting blocks of data from the cache. Compressor/Decompressor 113 may compress data being written into storage and decompress data being read from storage. The Storage System 104 also may include Deduplication Storage Engine 107, and one or more Storage Units 108-109 communica-tively coupled to each other. Storage Units 108-109 may be implemented locally (e.g., single node operating environment) or remotely (e.g., multi-node operating environment) via Interconnect 120, which may be a bus and/or a network (e.g., a storage network or a network similar to Network 103). Storage Units 108-109 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

In response to a data file to be stored in Storage Units 108-109, Deduplication Storage Engine 107 is configured to segment the data file into multiple chunks (also referred to as segments) according to a variety of segmentation policies or rules. Deduplication Storage Engine 107 may choose not to store a chunk in a storage unit if the chunk has been previously stored in the storage unit. In the event that Deduplication Storage Engine 107 chooses not to store the chunk in the storage unit, it stores metadata enabling the reconstruction of the file using the previously stored chunk. As a result, chunks of data files are stored in a deduplicated manner, either within each of storage Units 108-109 or across at least some of storage Units 108-109. The metadata, such as Metadata 110-111, may be stored in at least some of storage Units 108-109, such that files can be accessed independent of another storage unit. Metadata of each storage unit includes enough information to provide access to the files it contains.

In one embodiment, any of clients 101-102 may further include an optional deduplication engine (e.g., deduplication engines 151-152) having at least a portion of functionalities of deduplication Engine 107. Deduplication engines 151-152 are configured to perform local deduplication operations, respectively. For example, prior to transmitting the data to Storage System 104, each of the deduplication engines 151-152 may segment the data into multiple chunks and determine whether the chunks have been previously stored at Storage System 104. In one embodiment, chunks are transmitted only if they have not been previously stored in Storage System 104.

For example, when Client 101 is about to transmit a data stream (e.g., a file or a directory of one or more files) to Storage System 104, Deduplication Engine 151 is configured to deduplicate the data stream into deduplicated segments. For each of the deduplicated segments, Client 101 transmits a fingerprint of the deduplicated segment to Storage System 104 to determine whether that particular deduplicated segment has already been stored in Storage System 104. A deduplicated segment that has been stored in Storage System 104 may be previously received from the same Client 101 or from another client such as Client 102. In response to a response from Storage System 104 indicating that the segment has not been stored in Storage System 104, that particular segment is then transmitted to the Storage System 104. As a result, the network traffic and the processing resources required can be greatly reduced.

Figure 2:
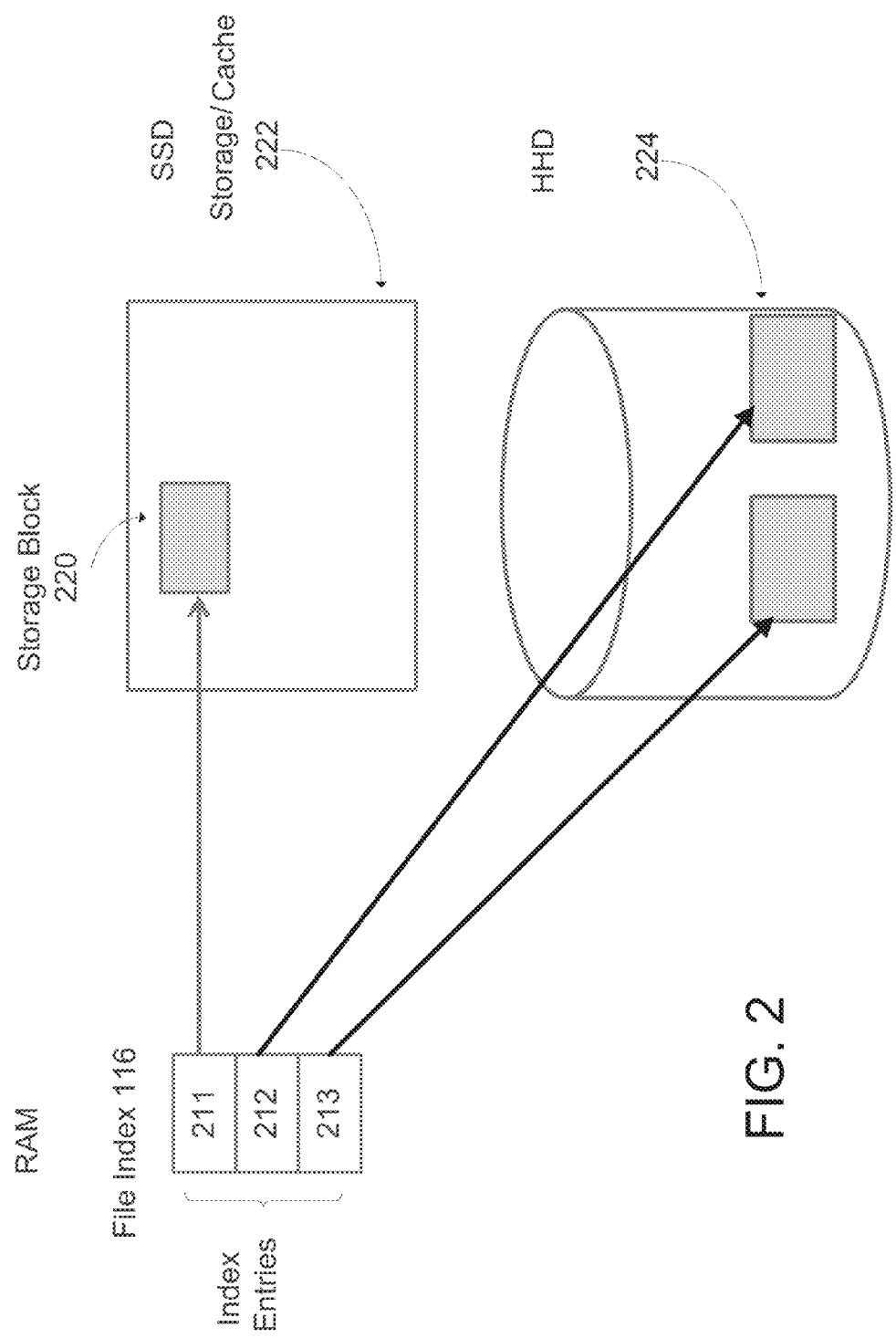
FIG. 2 is a high level diagram illustrating a storage index indexing blocks in a cache device and on a storage device, according to an embodiment of the invention.

FIG. 2 is a high level diagram illustrating a storage index that indexes blocks in a cache and on a hard disk, according to an embodiment of the invention. A File Index 116 may be stored in main memory for fast access. As illustrated in FIG. 2, File Index 116 includes Index Entries 211, 212, and 213. Each of the these index entries stored in main memory contains information about an indexed block stored in a Solid State Device (SSD) such as flash memory or on a hard disk drive (HDD). Index Entry 211 identifies the starting location of indexed block 220 that is stored on a SSD 222.

Index Entries 212 and 213 identify the starting locations of indexed blocks stored on HDD 224.

Figure 3:
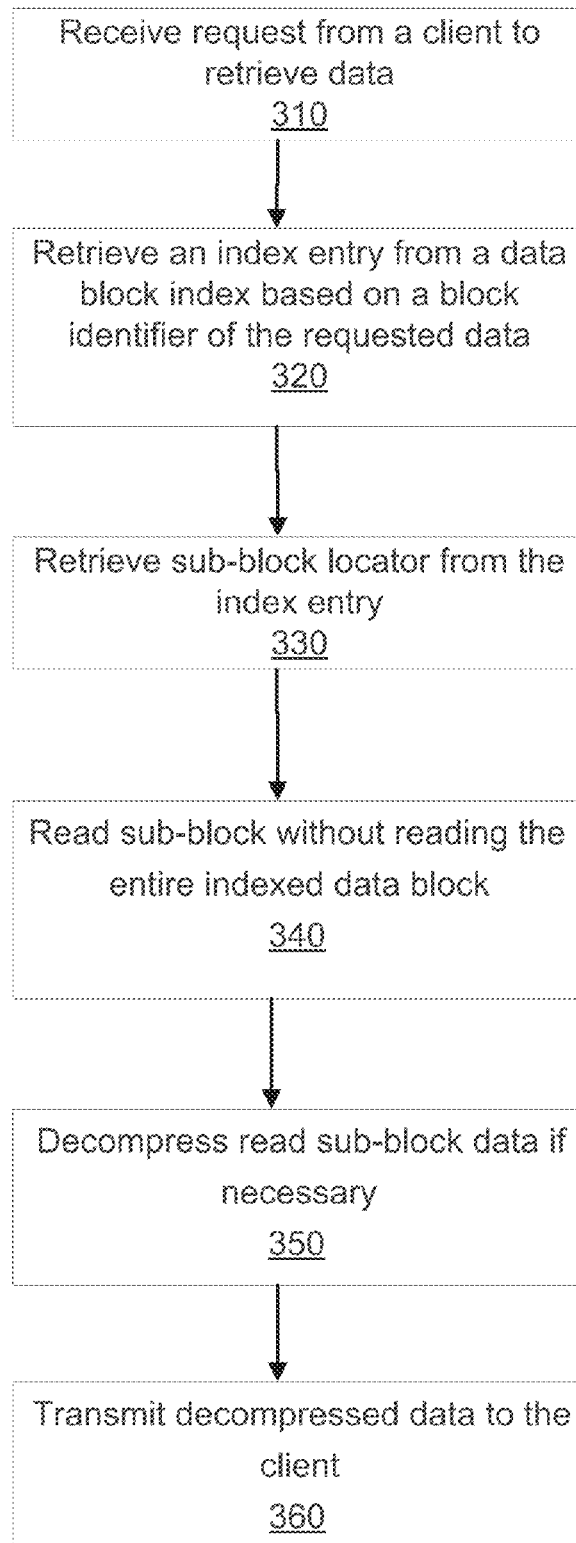
FIG. 3 is a flow diagram illustrating a process to read a sub-block of data stored in compressed form within a larger indexed storage block, according to an embodiment of the invention.
Figure 4:
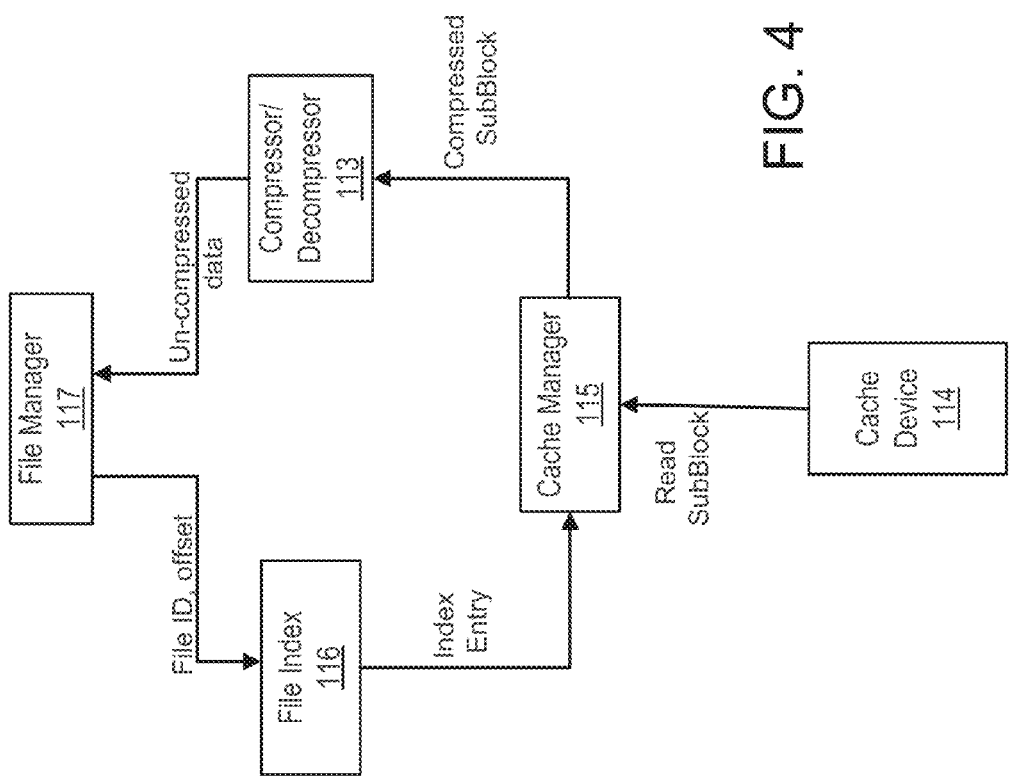
FIG. 4 is a flow diagram showing the role of components in the flow of data for reading a block that is stored in a cache device in a compressed form, according to an embodiment of the invention.

FIG. 3 is a flow diagram illustrating a method for reading a sub-block of data stored in compressed form within a larger indexed storage block, according to an embodiment of the invention. The method as shown in FIG. 3 may be performed by processing logic, which may include software, hardware, or a combination thereof. FIG. 4 is a flow diagram showing the role of storage management components in the flow of data for reading a block that is stored in a cache/storage device in a compressed form, according to an embodiment of the invention. Referring to FIGS. 3 and 4, at Block 310 a request is received from a client to retrieve data in the cache or in storage. File Manager 117 may request to read a block of data from a file by specifying a file identifier (ID) and an offset into the file. In Block 320, an index entry is retrieved from an index that indexes data blocks in a cache or storage based on a data identifier of the requested data. The file ID and offset may be used to find an index entry in File Index 116 that contains information about the requested data. In Block 330, the appropriate sub-block locator is retrieved from the index entry. If the requested data is stored in a cache, the Cache Manager 115 (or storage manager) may use the index entry to locate the sub-block of the indexed block containing the requested data. In Block 340, a sub-block is read without reading the entire indexed data block, and in Block 350, if the sub-block is stored in compressed form, then the compressed sub-block is decompressed. The Compressor/Decompressor 113 may decompress the data and return the uncompressed data to the File Manager 117. In Block 360, the requested data is returned to the client.

Figure 5:
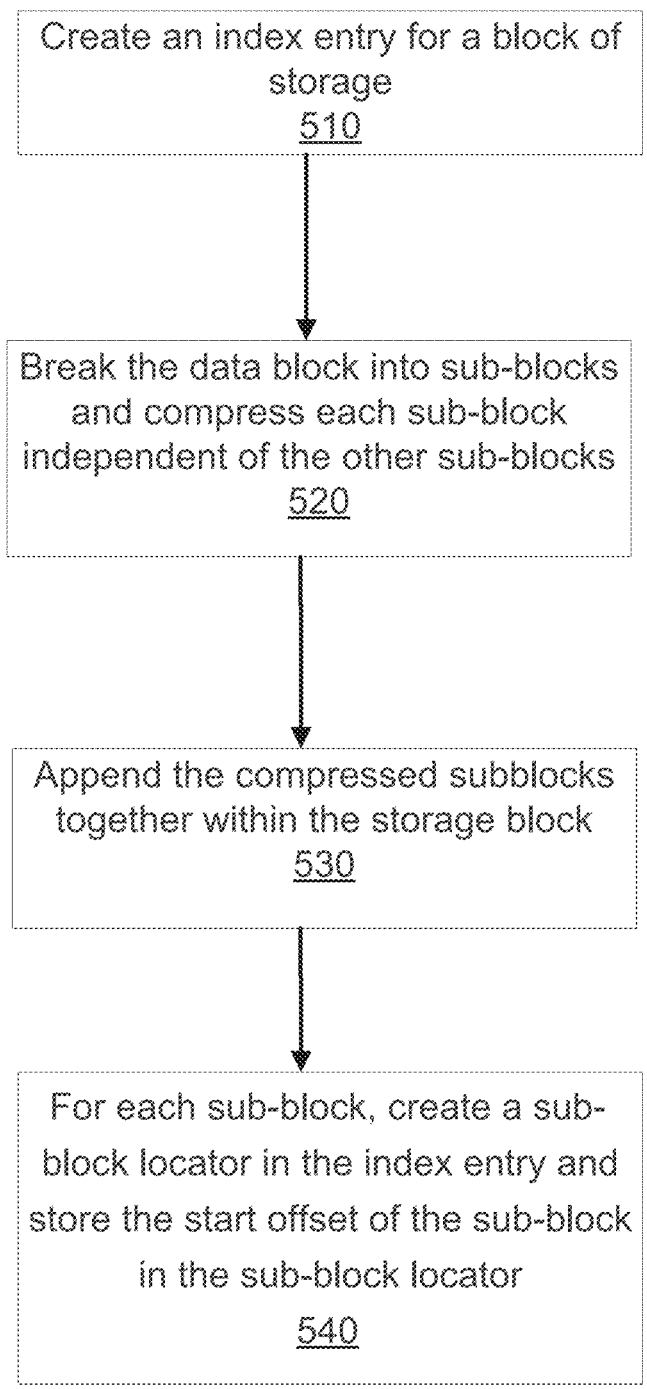
FIG. 5 is a flow diagram illustrating creating an index entry for a compressed data block containing sub-blocks within, according to an embodiment of the invention.
Figure 6:
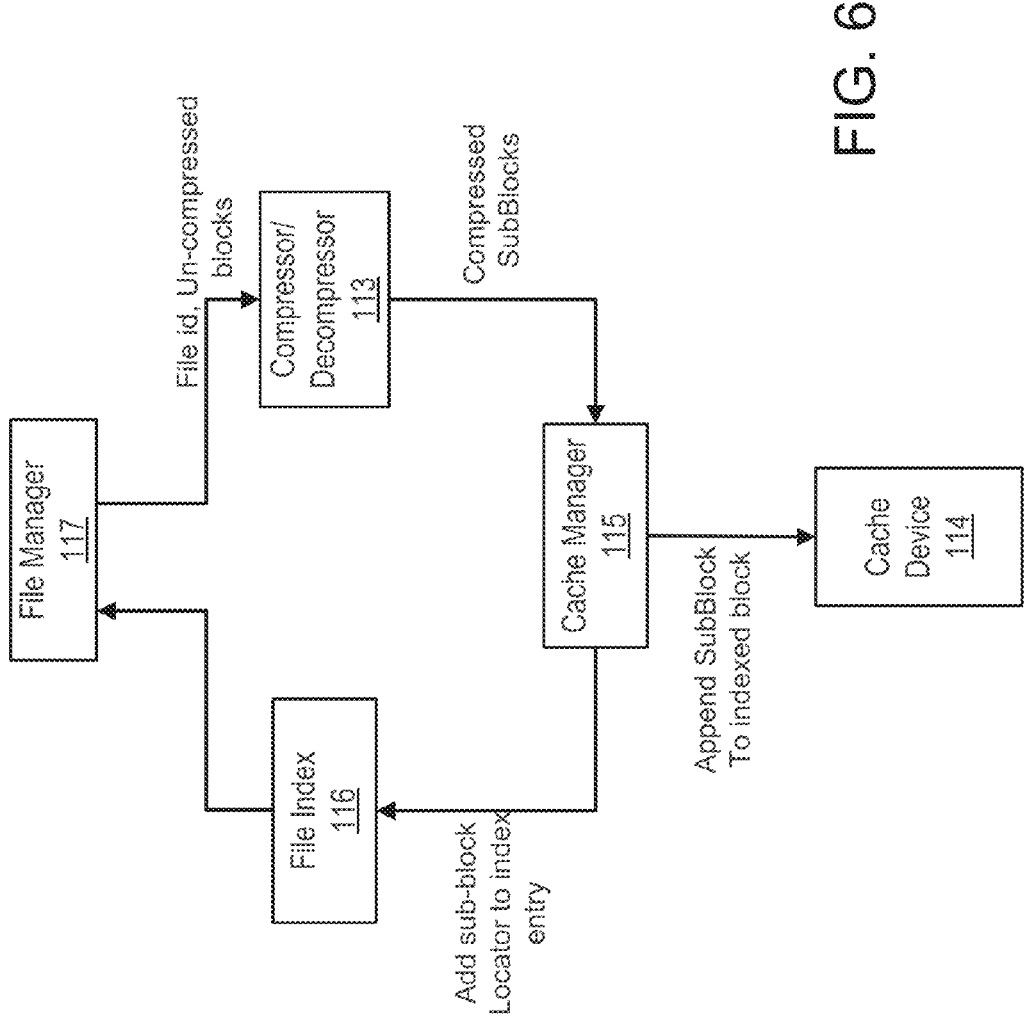
FIG. 6 is a flow diagram showing the role of components in the flow of data for writing a new block that is stored in a cache device in compressed form, according to an embodiment of the invention.

FIG. 5 is a flow diagram illustrating a method for creating an index entry for a compressed data block containing sub-blocks, according to an embodiment of the invention. FIG. 6 is a flow diagram showing the role of components in the flow of data for writing a new block that is stored in a cache/storage device in compressed form, according to an embodiment of the invention. Referring to FIGS. 5 and 6, File Manager 117 may write a block of data into a file represented by a File ID. In Block 510, a new index entry may be created for indexing the written block of data. In one embodiment, Compressor/decompressor 113 determines the compressibility of the block of data to be written into the file. In one such embodiment, the compressor/decompressor 113 determines that the write data is compressible if its size is reduced by a certain threshold size after compression. In response to such a determination, the compressor/decompressor 113 compresses the write data. In Block 520, the data block may be broken into sub-blocks and each sub-block is optionally and independently compressed. In Block 530, the sub-blocks may be appended together. In one embodiment, the Cache Manager 115 (or storage manager) caches the resulting appended block in the Cache Device 114 (or storage device). In Block 540, for each sub-block, create a sub-block locator in the index entry and store the start offset of the sub-block in the sub-block locator. The Cache Manager 115 may request that the new index entry be added to the File Index 116 to index the newly written sub-block. After indexing the written data, control returns to the File Manager 117.

Figure 7:
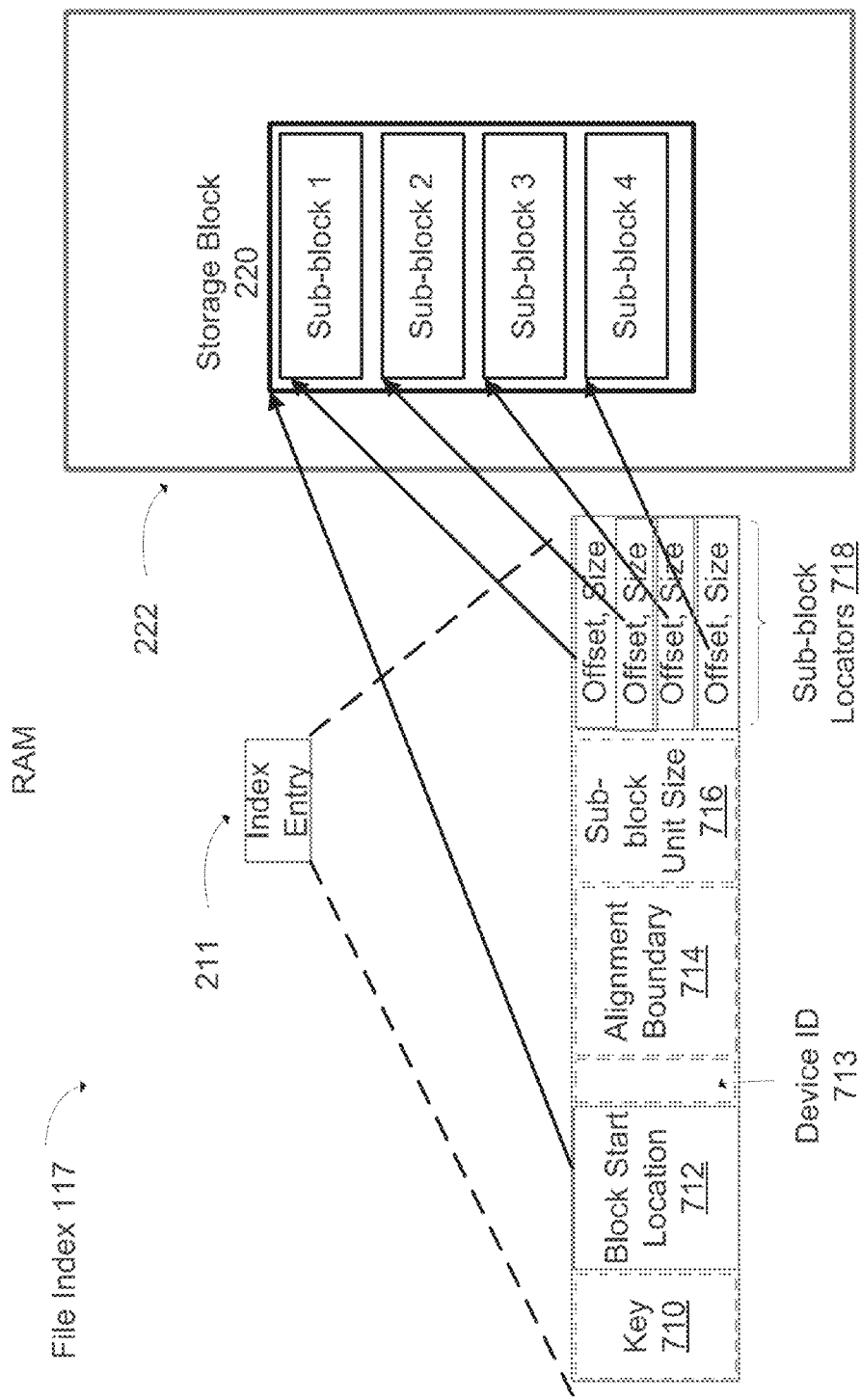
FIG. 7 illustrates an index entry storing sub-block offsets with a larger block of indexed storage, according to an embodiment of the invention.

FIG. 7 is a block diagram illustrating an index entry storing sub-block offsets within a larger block of indexed storage, according to an embodiment of the invention. FIG. 7 shows an example structure Index Entry 211. The index entry for Storage Block 220 may comprise at least a Block Start Location 712 and one or more Sub-block Locators 718. Block Start Location 712 identifies the start of the indexed block on the cache/storage device. Each sub-block locator of Sub-block Locators 718 may comprise a starting offset and a size of the sub-block, according to an embodiment. In an embodiment, both compressed and uncompressed size may be stored in Sub-block Locator 718. In another embodiment, the size of the sub-block does not have to be included in the sub-block locator since it can be calculated based on the offsets of neighboring sub-blocks. Storage Block 220 is illustrated as having sub-blocks 1-4 within the block. There are four sub-block locators in this example, each one corresponding to a sub-block within Storage Block 220. The offset pointers indicate the offset within the Storage Block 220, and the size may indicate how many bytes of data are stored in the sub-block.

In some embodiments, the Index Entry 211 may further contain a Key 710, Device Identifier (ID) 713, Alignment Boundary 714, and/or Sub-block Unit Size 716. Key 710 may be used to resolve collisions for entries that hash to the same bucket in the index. The memory device identifier 713 may be used to indicate the device in which the index block resides if index entries for multiple devices are represented in the index. Alignment Boundary 714 may be included if the storage system starts each sub-block on a particular alignment boundary. For example, if all sub-blocks start at a 128 B boundary, then the Alignment Boundary 714 field of the index entry may contain a value of 128 B. Also, if the sub-blocks within the block are stored in a common-sized chunk, then the index entry may include the size of that common chunk. Storing the sub-block chunk size in each index entry allows the sub-block size to be different for each large indexed block. For example, the size of the sub-block may be selected based on the amount of data that is usually used at one time. A file of video media may use larger blocks and sub-blocks because a great number of bytes will be accessed at the same time. In contrast, a file holding a randomly-accessed database table with a record size of hundreds of bytes may use smaller sub-blocks as each record may be individually accessed independent of the other records in the table.

EXAMPLE

In a typical system indexing 32 KB blocks, if the client block access request size is 4 KB, 4 read operations are required in order to retrieve the entire compressed indexed block so that the requested 4 KB bytes may be identified and returned to the client. In comparison, using the technique described herein, it may only be necessary to perform one read operation to read the desired block from a SSD or storage device (i.e., the indexing technique described herein may be used for indexing cache blocks or storage blocks). Reading 4 blocks, even if they are sequential, is slower than reading a single block, so avoiding the unnecessary read operations may increase IOPS by roughly 4 times. In a realistic example used throughout this disclosure, IOPS may be increased by up to 4× for solid state drives.

The indexing that enables speeding up IOPS by 4× may cause the index to occupy more memory. As a simple example, consider a large block of size 32 KB divided into 8 4 KB sized sub-blocks that are each compressed to 2 KB in size. Appending the 8 compressed sub-blocks compressed to 2 KB each would result in a large 16 KB compressed block, the starting address of which may be stored in the index entry of the 32 KB large block. The first sub-block of compressed data may be stored in a SSD or Hard Disk Drive (HDD) starting at offset 0 and ending at offset 2 KB−1. The index entry may record that the first sub-block starts at address 0, and the second sub-block may start at an offset of 2 KB from the beginning of the indexed block. The remaining sub-blocks are recorded in this manner.

To retrieve a client-requested 4 KB sub-block stored as described above in this example, the address of the block requested by the client may be rounded down to the nearest 32 KB value, and the corresponding indexed block may be looked up in the index. The physical address of the sub-block containing the beginning of the requested data may be determined.

In one embodiment, using 32 KB blocks and allowing arbitrary sub-block alignment, 15 bits ($\log_2(32\text{ KB})$) may be needed in each sub-block locator in the index entry to store the offset address for each sub-block. If the typical 32 KB index entry requires 48B and 15 bits are needed in each sub-block locator for each of the eight sub-blocks, it is a memory increase of 8*15=120 bits (15 bytes). Thus, by increasing the index entry to 63 bytes, each entry occupies 15/48=31% more memory.

To further reduce the index entry size, according to an embodiment, sub-blocks may be aligned to specific address multiples (storage unit boundaries) instead of allowing sub-blocks to be stored at arbitrary address values. For example, compressed sub-blocks may be stored at multiples of 128 B boundaries. Space between the end of one sub-block and the beginning of another may be wasted. For example, the wasted space may be filled with zeros or any other value between sub-blocks to implement the desired alignment. As a result of aligning sub-blocks, fewer bits are needed to record sub-block offsets in the index. For example, if alignment is restricted to 128 B boundaries, then 8 bits ($\log_2(32\text{ KB}/128\text{ B})$) are needed to represent the offset, instead of 15 bits, to address each sub-block. If the typical 32 KB index entry requires 48B and one byte for each of the eight sub-blocks is needed, it is a memory increase of 17% for a 4×IOPS increase. There may be a trade-off: reducing memory requirements for the index has been achieved at the cost of wasting some space in a cache or storage device. As an example, a 32 KB block may have 8 4 KB compressed sub-blocks. In a worst case, this could lead to 127 B*8 sub-blocks, equaling 1016 B of wasted space. This is a 3% loss of space relative to a 32 KB uncompressed block size and a 6% loss of space relative to a 16 KB compressed block size. On average, the wasted space is 64 B*8 sub-blocks, which has half the wasted space of the worst case. In addition, a second potential downside of this approach is that compression techniques are often less effective with smaller amounts of data to compress causing a loss of storage capacity. This effect is difficult to quantify, but again is likely in the range of at most a few percent. Considering how these small losses of capacity are balanced by increased IOPS, the net result is an overall positive for most caching and storage systems. This technique increases IOPS while controlling memory overheads, which is often of a higher priority than a small loss of storage capacity.

Figure 8:
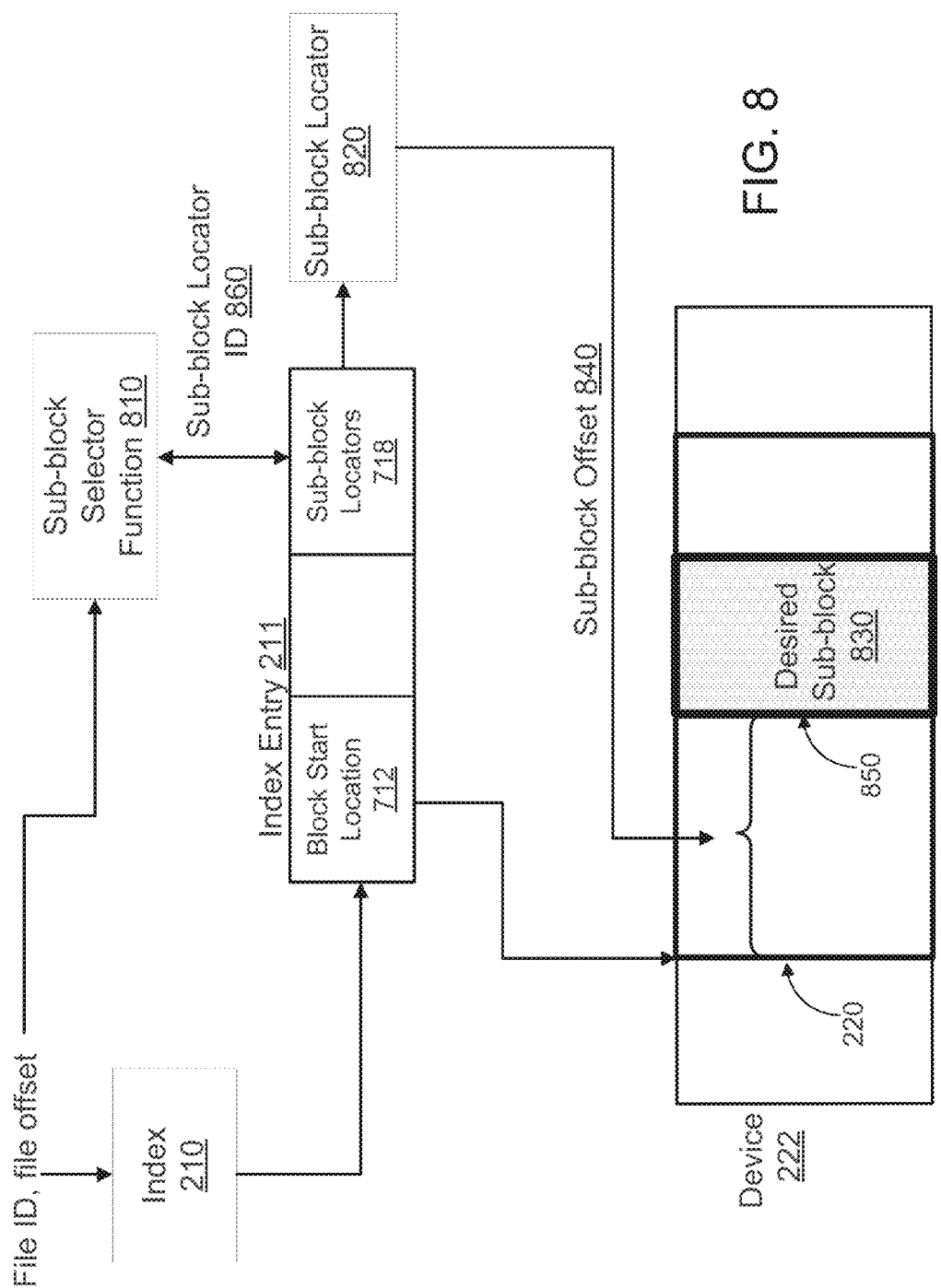
FIG. 8 illustrates in more detail how a File ID and file offset may be used with the Index 210 to identify a desired sub-block, according to an embodiment of the invention.

FIG. 8 is a block diagram illustrating in more detail how a File ID and a file offset may be used with the Index 210 to identify a desired sub-block, according to an embodiment of the invention. The File ID and file offset, which may be provided by File Manager 117 of FIG. 1, are looked up in Index 210 to identify an Index Entry 211 for the indexed block containing the desired data. The Block Start Location 712 identifies the starting address for the indexed block 220 on device 222. To determine the offset of the desired sub-block from the start of the indexed block 220, a Sub-block Selector Function 810 may compare the file offset with offset information in the set of Sub-block Locators 718 to identify which Sub-block Locator Entry 820 contains information about the desired sub-block. Sub-block Selector Function 810 may be implemented as part of Cache Manager 115 of FIG. 1. The Sub-block Locator 820 contains the Sub-block Offset 840 of the corresponding Desired Sub-block 830. The Sub-block Offset 840 added to the Block Start Location 712 provides the Desired Sub-block 830 address 850.

Figure 9:
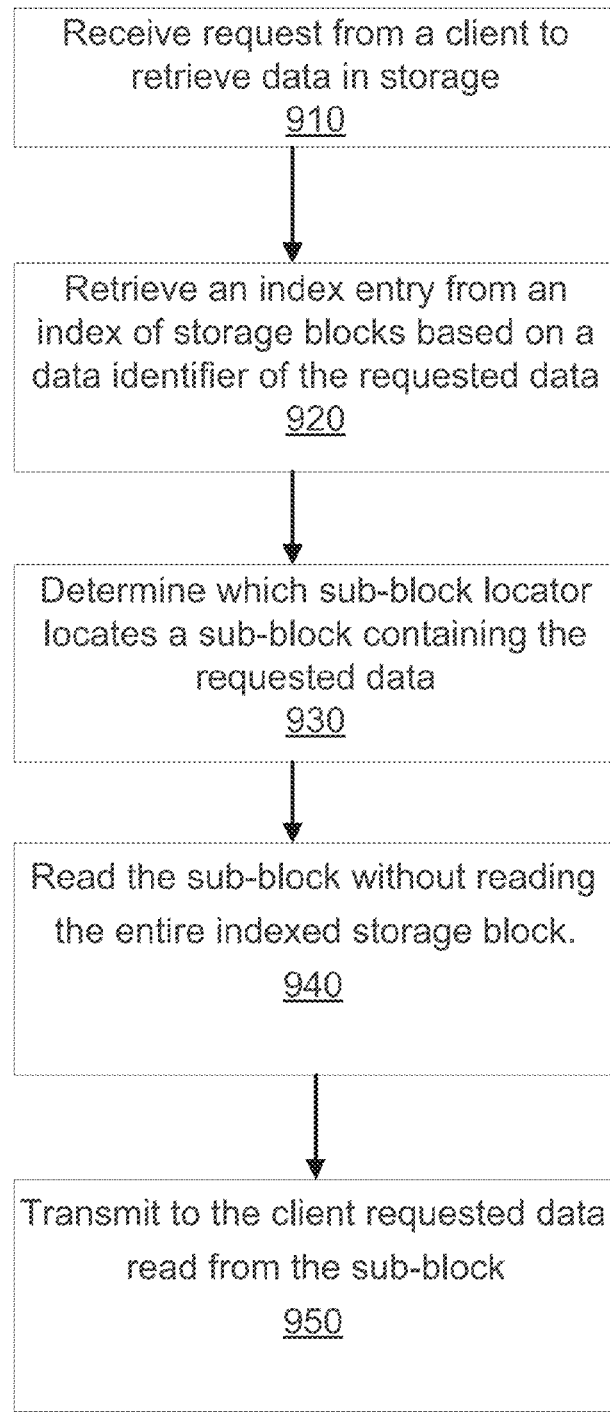
FIG. 9 is a flow diagram illustrating using the index entry to read a sub-block from within a larger indexed data block, according to an embodiment of the invention.

FIG. 9 is a flow diagram illustrating a method of using the index entry to read a sub-block from within a larger indexed data block, according to an embodiment of the invention. The method as shown in FIG. 9 may be performed by processing logic, which may include software, hardware, or a combination thereof. For example, the method may be performed by Cache Manager 115 of FIG. 1. In Block 910, a request is received from a client to access data in storage. The request includes an identifier of the requested data block. The identifier may be mapped to a byte addresses relative to the start of the storage device which is the starting address of the requested data. The amount of data returned to the client is defined or implied in the request. For example, a request from a file system may request a response that includes 4 KB of data. Moving to Block 920, an index entry is retrieved from an index of storage blocks based on a data identifier of the requested data. The index entry includes an indication of the location on the storage device of the start of the indexed storage block and also contains sub-block locators that identify the start of sub-blocks within the indexed storage block. A sub-block locator may be an offset, such as a byte offset, from the beginning of the indexed storage block. Thus, the first sub-block in the storage block may have an offset of 0.

Continuing in Block 930, a sub-block locator corresponding to the sub-block containing the requested data is determined. The Sub-block Locator ID 860 may be an index into an array of sub-block locators. Alternatively, it may an address of any type of data structure containing information about the corresponding sub-block. The sub-block locator may contain the starting offset of the desired sub-block. In an embodiment, the sub-block locator may include the size of the sub-block as compressed, uncompressed, or both as well as other information about the sub-block.

Proceeding to Block 940, without reading the entire indexed storage block, read the requested amount of data from the sub-block starting at the desired sub-block offset.

Once the data is read, then in Block 950, the data read from the sub-block may be transmitted back to the client in response to the request.

Figure 10:
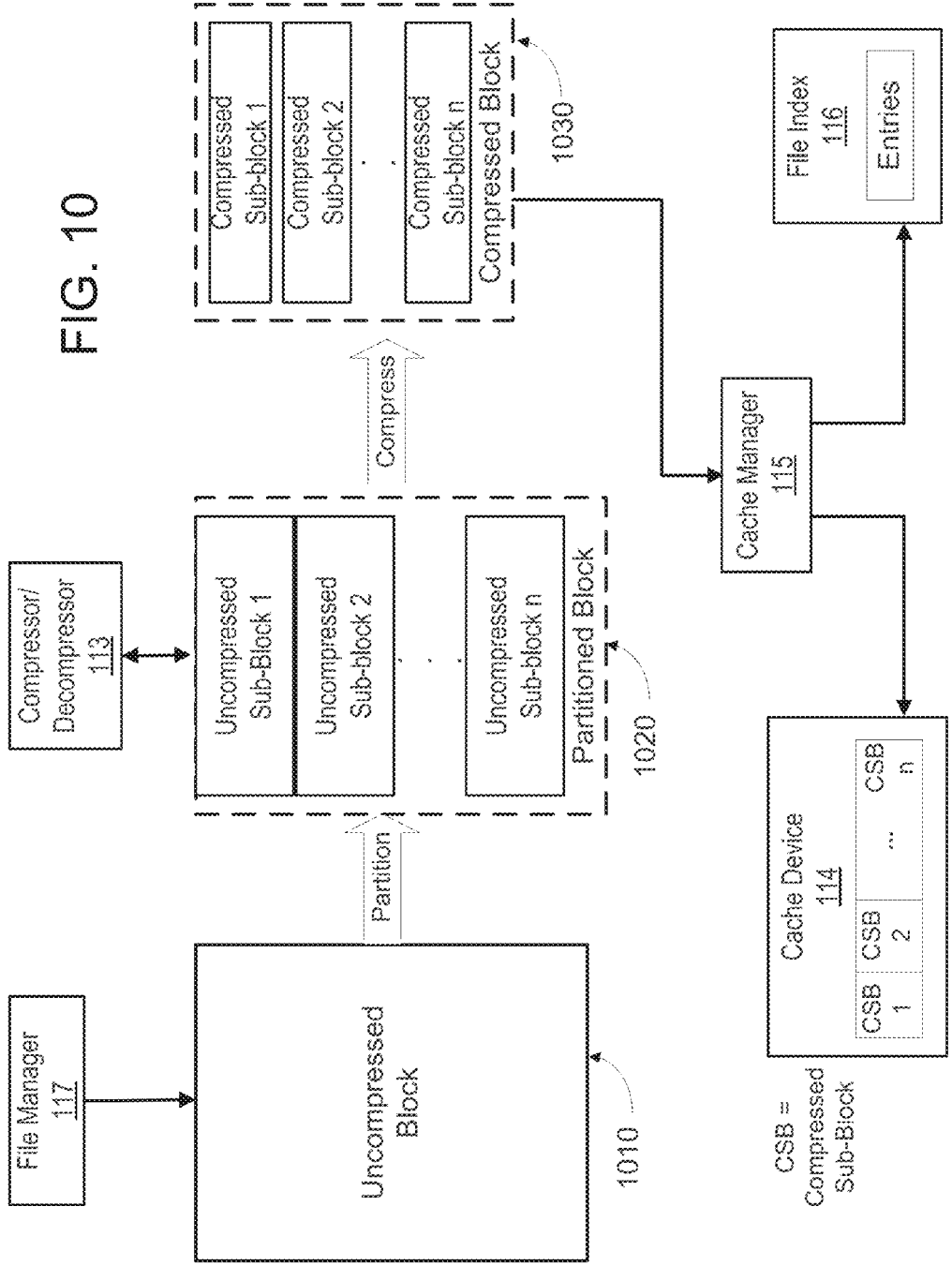
FIG. 10 is a block diagram showing the indexing of compressed blocks, according to an embodiment of the invention.

One technique that is used to reduce I/O and storage space is to compress data when stored and decompress data when read from the cache or storage device. FIG. 10 is a block diagram showing the indexing of compressed blocks, according to an embodiment of the invention. File Manager 117 requests to write a block of Uncompressed Block 1010 to the cache/storage system. Before performing compression, the Uncompressed Block 1010 may be partitioned into a set of uncompressed sub-blocks 1 . . . n to form a Partitioned Block 1020. Once partitioned, each uncompressed sub-block may be compressed by the compressor/decompressor 113. The compression may be performed on a sub-block in isolation; that is, each sub-block may be compressed to create a compressed sub-block such as compressed sub-blocks 1 . . . n. independent of the other sub-blocks within the common Partitioned Block 1020. The compressed sub-blocks may be appended or placed on alignment boundaries to minimize gaps between the sub-blocks to form a Compressed Block 1030. The Cache Manager 115 (or storage manager) may store Compressed Block 1030 in a Cache Device 114 (or storage device). The starting location of Compressed Block 1030 may be provided to Cache Manager 115 for creating an index entry (e.g., entries in File Index 116) for the new compressed block.

Figure 11:
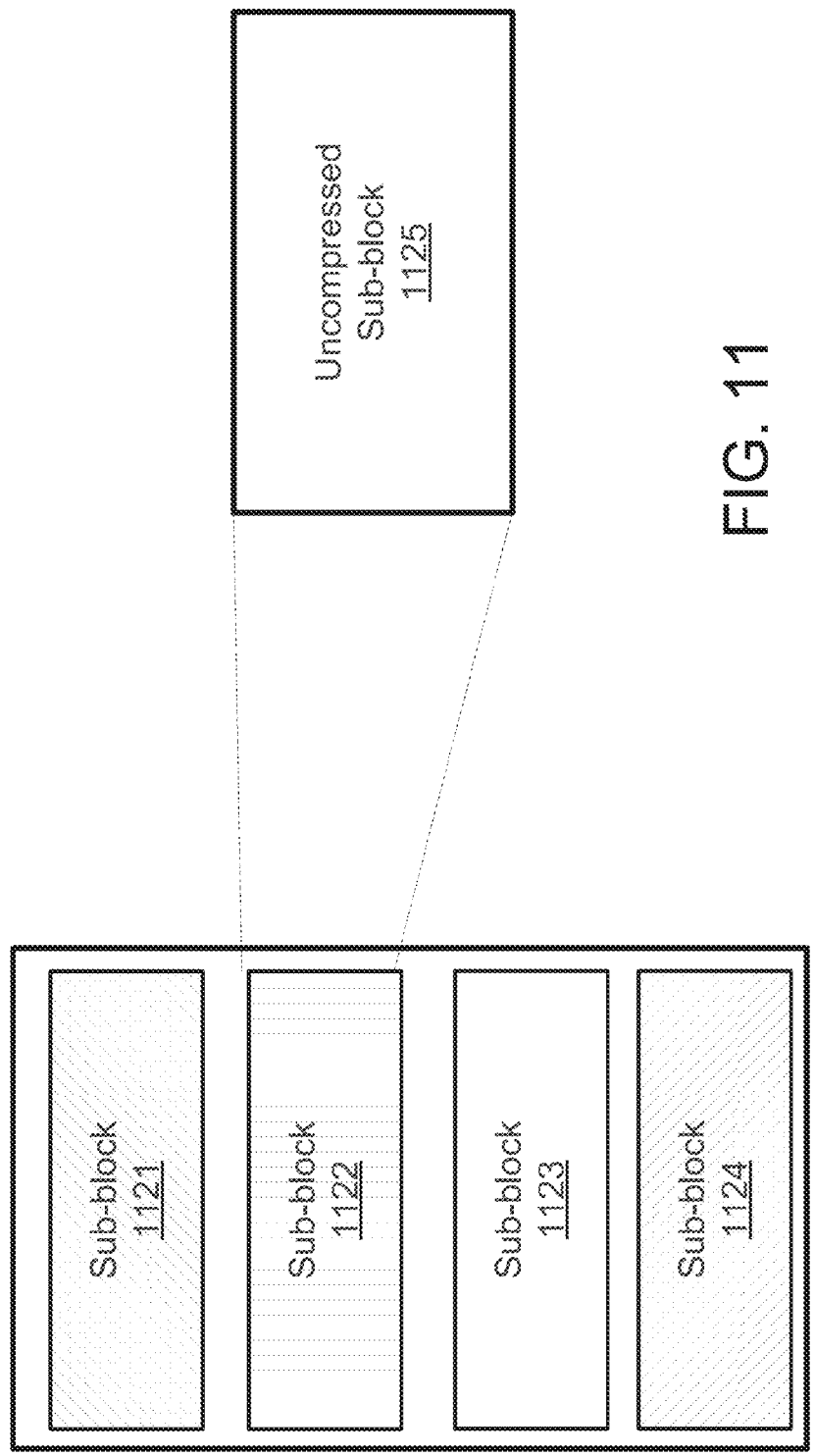
FIG. 11 illustrates a sub-block retrieved and uncompressed independent from the other sub-blocks in the indexed data block, according to an embodiment of the invention.

FIG. 11 is a block diagram illustrating a sub-block retrieved and uncompressed independent from the other sub-blocks in the indexed data block, according to an embodiment of the invention. The different shading patterns of each Sub-block 1121, 1122, 1123, and 1124 illustrate that each of these sub-blocks are compressed separately. Thus, it is possible to read and decompress Sub-block 1122 into Uncompressed Sub-block 1125 without reading or decompressing any of sub-blocks 1121, 1123, or 1124. Furthermore, in an embodiment, some sub-blocks within an indexed storage block may be stored as compressed and others stored within the same indexed storage block need not be. Sub-block 1123 is not shaded to indicate that it is stored with no compression. If compressing a particular sub-block does not significantly reduce the size that the sub-block occupies in storage, then there is no storage savings benefit to offset the processing time required to compress and decompress the sub-block. Such a block may be stored uncompressed while another sub-block in the same indexed block may be highly compressible, and thus, stored in compressed format. In an embodiment, an indication that the sub-block is stored in a compressed format may be stored in the corresponding sub-block locator or in the content of the sub-block itself. The decision to store compressed sub-blocks can be determined per sub-block within a block independently, for all sub-blocks within a block, or for arbitrary groups of blocks and their respective sub-blocks.

Figure 12:
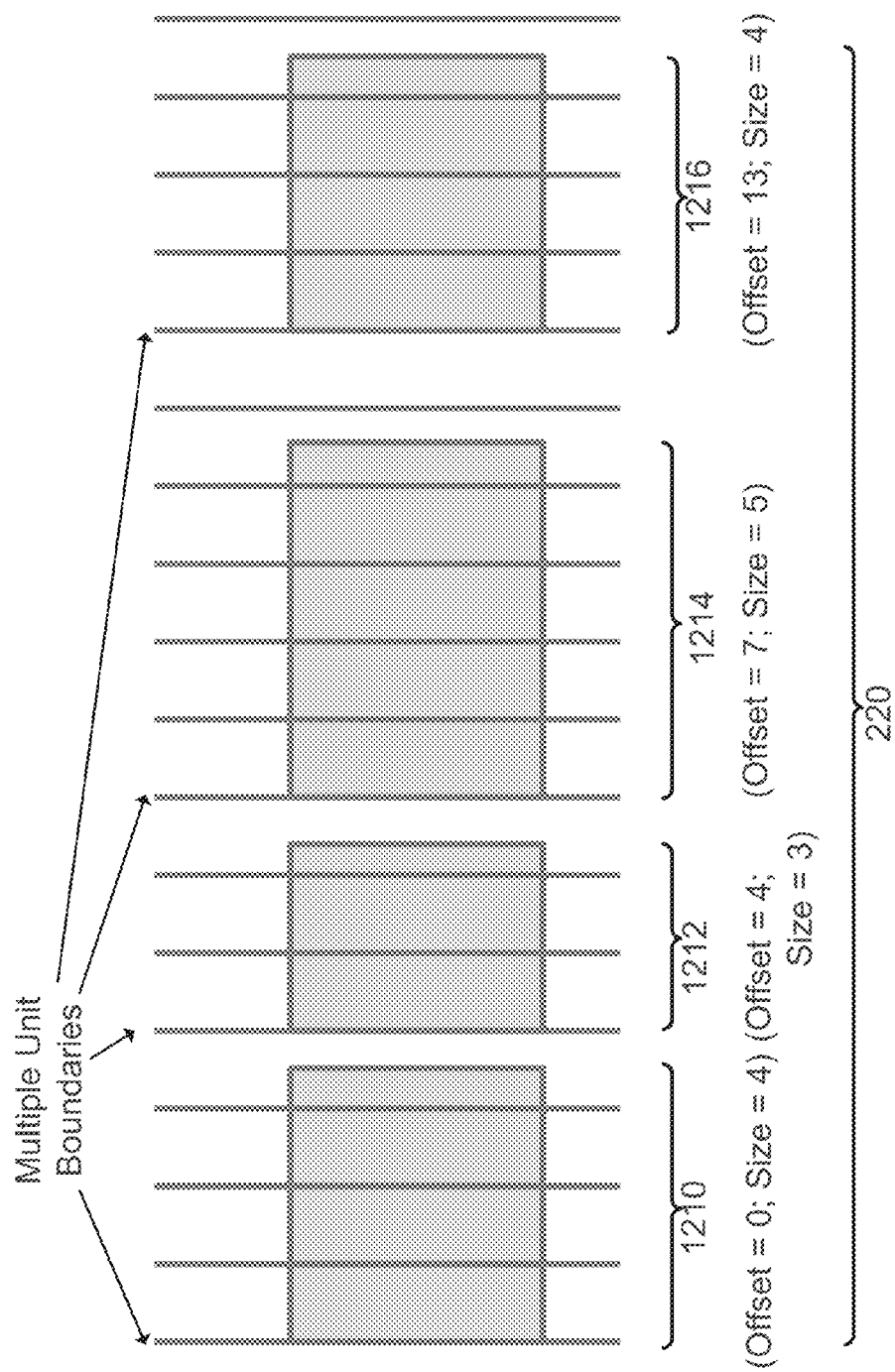
FIG. 12 illustrates storing fixed-sized sub-blocks on storage unit boundaries, according to an embodiment of the invention.

FIG. 12 illustrates storing sub-blocks on alignment boundaries, according to an embodiment of the invention. As illustrated, Storage Block 220 is shown having four Sub-blocks 1210, 1212, 1214, and 1216. The vertical lines represent alignment unit boundaries. For example, if the sub-blocks are stored on a unit boundary with a multiple of 128 B, the first vertical line may represent 0B, the second line may represent 128 B, the third line may represent 256B, etc. In this embodiment, Sub-block 1210 begins at offset 0B, and occupies 4 storage units. The alignment unit boundaries may be any number of bytes, usually selected as a power of 2 for convenience, but not required. For the example of FIG. 12, the units are 128 B. Thus, Sub-block 1210 occupies 4*128 B or 512 B. The data written into the sub-block may not occupy the entire fourth block, and so there might be some wasted storage space between Sub-block 1210 and Sub-block 1212. Similarly, Sub-block 1212 starts at an offset of 4 (or 4*128 B=512 B) and occupies 3 units (or 3*128 B=384B). Sub-block 1216 starts at a unit offset of 13 (or 13*128 B bytes=1.66 KB) and occupies 4 units of space (or 4*128 B=512 B). Storing sub-blocks on a unit boundary reduces the number of bits required in the sub-block locator for representing the offset. For example, instead of storing an offset of 1.66 KB, requiring 13 bits to encode in the sub-block locator, an offset of 13 may be stored, requiring 4 bits in the sub-block locator. A sub-block that straddles device boundaries may require two read operations, one for each physical block storing a portion of the sub-block. By storing sub-blocks on fixed unit boundaries, the system may avoid unnecessary read operations when unit boundaries align with storage device boundaries such as SSD pages or HDD tracks.

Similarly, storing sub-blocks in an integral number of fixed sized units reduces the space required to store the size of the sub-block in the sub-block locator. Instead of storing a sub-block size of 512 KB (requiring 8 bits in the sub-block locator), the index locator need only store 4 units (requiring 3 bits in the sub-block locator). Although storing sub-blocks in fixed sized units may waste some space on the device, RAM is a more expensive and constrained resource than SSD or HDD, so a small waste of space in the cache/storage in order to reduce the size of the index in memory is a desirable tradeoff.

Figure 13:
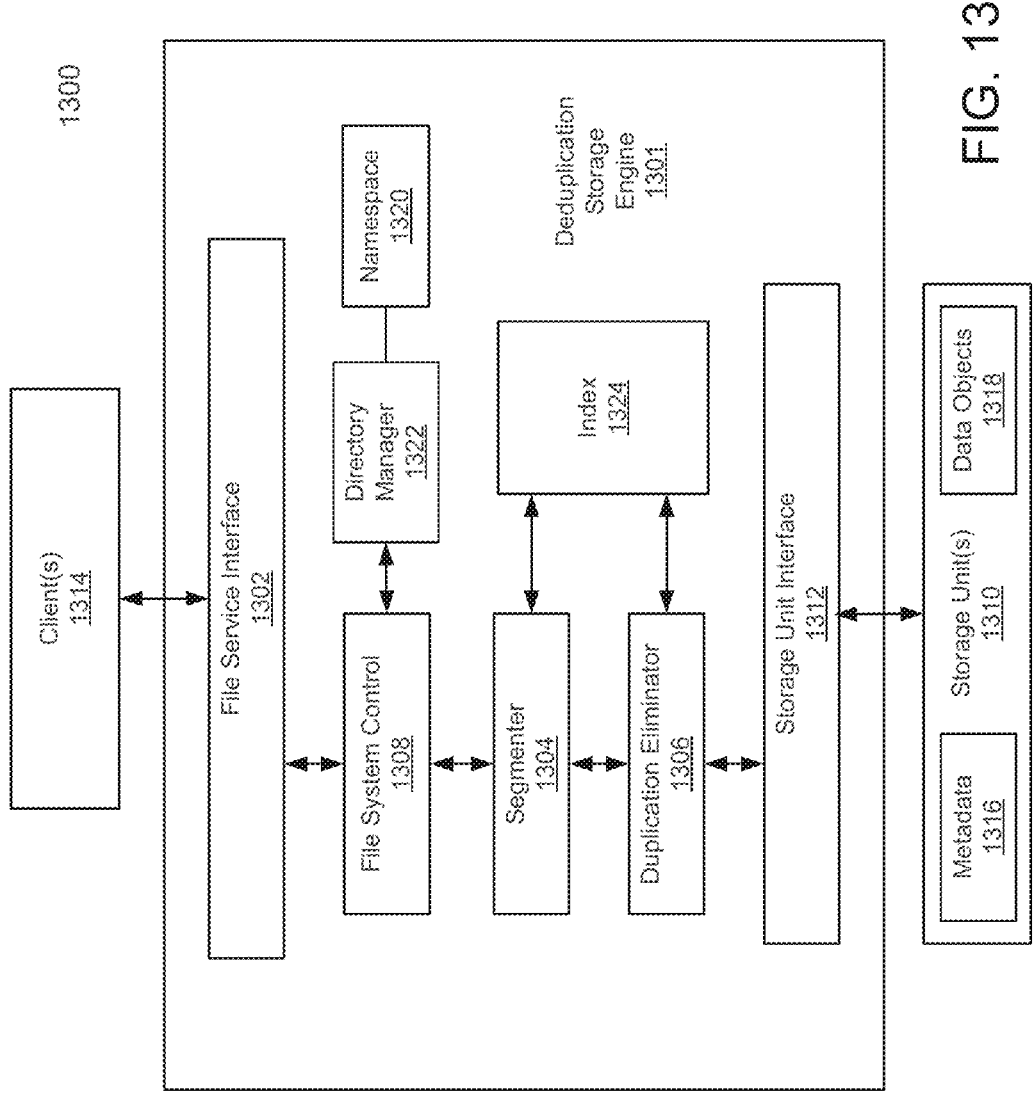
FIG. 13 is a block diagram illustrating a deduplicated storage system according to one embodiment of the invention.

FIG. 13 is a block diagram illustrating a deduplication storage system according to one embodiment of the invention. For example, deduplication storage system 1300 may be implemented as part of a deduplication storage system as described above, such as, for example, the deduplication storage system as a client and/or a server as shown in FIG. 1. In one embodiment, storage system 1300 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 1300 may have a distributed architecture, or all of its components may be integrated into a single unit. Storage system 1300 may be implemented as part of an archive and/or backup system such as a deduplicating storage system available from EMC® Corporation of Hopkinton, Mass.

In one embodiment, storage system 1300 includes a deduplication engine 1301 interfacing one or more clients 1314 with one or more storage units 1310 storing metadata 1316 and data objects 1318. Clients 1314 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1310 may be implemented locally (e.g., single node operating environment) or remotely (e.g., multi-node operating environment) via an interconnect, which may be a bus and/or a network (e.g., a storage network). In one embodiment, one of storage units 1310 operates as an active storage to receive and store external or fresh user data from a client (e.g., an end-user client or a primary storage system associated with one or more end-user clients), while the another one of storage units 1310 operates as a target storage unit to periodically archive data from the active storage unit according to an archiving policy or scheme. Storage units 1310 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1310 may also be combinations of such devices. In the case of disk storage media, the storage units 1310 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1316, may be stored in at least some of storage units 1310, such that files can be accessed independent of another storage unit. Metadata of each storage unit includes enough information to provide access to the files it contains. In one embodiment, metadata may include fingerprints contained within data objects 1318, where a data object may represent a data chunk, a compression region (CR) of one or more data chunks, or a container of one or more CRs. Fingerprints are mapped to a particular data object via metadata 1316, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 1316 may include a file name, a storage unit identifier (ID) identifying a storage unit in which the chunks associated with the file name are stored, reconstruction information for the file using the chunks, and any other appropriate metadata information. Metadata 1316 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk (also referred to as a data segment), one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1301 includes file service interface 1302, segmenter 1304 (also referred to as a chunking module or unit), duplicate eliminator 1306, file system control 1308, and storage unit interface 1312. Deduplication storage engine 1301 receives a file or files (or data item(s)) via file service interface 1302, which may be part of a file system namespace 1320 of a file system associated with the deduplication storage engine 1301. The file system namespace 1320 refers to the way files are identified and organized in the system. An example is to organize the files hierarchically into directories or folders, which may be managed by directory manager 1322. File service interface 1312 supports a variety of protocols, including a network file system (NFS), a common Internet file system (CIFS), and a virtual tape library interface (VTL), etc.

The file(s) is/are processed by segmenter 1304 and file system control 1308. Segmenter 1304, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based, such as, for example, a hash function is applied to values of data within a sliding window through the data stream or block and when the hash function is equal to a value (or equal to one of several values) then a chunk boundary is identified. In various embodiments, chunk boundaries are identified using content based functions operating on a sliding window within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, a chunk boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 1308, also referred to as a file system manager, processes information to indicate the chunk(s) association with a file. In some embodiments, a list of fingerprints is used to indicate chunk(s) associated with a file. File system control 1308 passes chunk association information (e.g., representative data such as a fingerprint) to index 1324. Index 1324 is used to locate stored chunks in storage units 1310 via storage unit interface 1312. Duplicate eliminator 1306, also referred to as a segment store, identifies whether a newly received chunk has already been stored in storage units 1310. In the event that a chunk has already been stored in storage unit(s), a reference to the previously stored chunk is stored, for example, in a chunk or segment tree associated with the file, instead of storing the newly received chunk. A chunk or segment tree of a file may include one or more nodes and each node represents or references one of the deduplicated chunks stored in storage units 1310 that make up the file. Chunks are then packed by a container manager (which may be implemented as part of storage unit interface 1312) into one or more storage containers stored in storage units 1310. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to as deduplicated segments). A container may further contain the metadata such as fingerprints, sketches, type of the data chunks, etc. that are associated with the data chunks stored therein.

When a file is to be retrieved, file service interface 1302 is configured to communicate with file system control 1308 to identify appropriate chunks stored in storage units 1310 via storage unit interface 1312. Storage unit interface 1312 may be implemented as part of a container manager. File system control 1308 communicates (e.g., via segmenter 1304) with index 1324 to locate appropriate chunks stored in storage units via storage unit interface 1312. Appropriate chunks are retrieved from the associated containers via the container manager and are used to construct the requested file. The file is provided via interface 1302 in response to the request. In one embodiment, file system control 1308 utilizes a tree (e.g., a chunk tree obtained from namespace 1320) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1301 may be implemented in software (e.g., executable code executed in a memory by a processor), hardware (e.g., processor(s)), or a combination thereof. For example, deduplication engine 1301 may be implemented in a form of executable instructions that can be stored in a machine-readable storage medium, where the instructions can be executed in a memory by a processor.

In one embodiment, storage system 1300 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for reading data from a storage block stored in a device, the method comprising:
    in response to a request from a client to access data, retrieving an index entry from an index of storage blocks based on a data identifier of the requested data, wherein the index entry includes a start location of an indexed storage block stored in the device, and information identifying a plurality of sub-block locators, wherein each sub-block locator of the plurality of sub-block locators includes a start offset of a sub-block within the indexed storage block;
    determining which sub-block locator, of the plurality of sub-block locators within the index entry, locates a sub-block containing the requested data based on the start location of the indexed storage block and the data identifier of the requested data;
    without reading the entire indexed storage block, reading the sub-block from the device starting at a device location determined based on the start location of the indexed storage block within the device and the sub-block start offset of the determined sub-block locator; and
    transmitting the requested data read from the sub-block to the client.

2. The method of claim 1, wherein the sub-block data read from the device is compressed data, and the method further comprising:
    decompressing, independent from other data in the indexed storage block, the compressed data read from the sub-block; and
    responsive to the request to read data, transmitting the decompressed data as the requested data.

3. The method of claim 1, wherein the indexed storage block comprises a plurality of appended sub-blocks, and one or more appended sub-blocks of the plurality of appended sub-blocks are compressed independently from each other.

4. The method of claim 3, wherein at least one sub-block of the plurality of appended sub-blocks in the indexed storage block is not compressed.

5. The method of claim 1, wherein:
    each sub-block is aligned to start at an address boundary whose value is a multiple of a number of alignment units, N, where N>1; and
    the method further comprising determining the start address of a sub-block containing the requested data based on the sub-block start offset and N.

6. The method of claim 5, wherein a value for the number of alignment units is stored within each index entry and used only for sub-blocks residing within the indexed storage block, and the method further comprising:
    retrieving a first number of alignment units, N, from a first index entry;
    responsive to receiving a second request for a second data identifier of second requested data, retrieving a second number of alignment units, M, from a second index entry distinct from the first index entry, wherein N is not the same as M; and
    determining a second start address of a sub-block containing the requested data in response to the second request based on a second sub-block start offset and M.

7. The method of claim 1, wherein each index entry includes an identifier of the device on which the indexed storage block is stored.

8. The method of claim 1, further comprising retrieving from the determined sub-block locator a sub-block size, wherein the sub-block size is a number of storage units occupied by the sub-block.

9. A method of claim 1, wherein the size of each sub-block is stored within the sub-block on the device.

10. A non-transitory computer-readable medium storing instructions, which when executed by one or more processors, cause the one or more processors to:
    in response to a request from a client to access data, retrieve an index entry from an index of storage blocks based on a data identifier of the requested data, wherein the index entry includes a start location of an indexed storage block stored in a device, and information identifying a plurality of sub-block locators, wherein each sub-block locator of the plurality of sub-block locators includes a start offset of a sub-block within the indexed storage block;
    determine which sub-block locator, of the plurality of sub-block locators within the index entry, locates a sub-block containing the requested data based on the start location of the indexed storage block and the data identifier of the requested data;
    without reading the entire indexed storage block, read the sub-block from the device starting at a device location determined based on the start location of the indexed storage block within the device and the sub-block start offset of the determined sub-block locator; and
    transmit the requested data read from the sub-block to the client.

11. The non-transitory computer-readable medium of claim 10, wherein the sub-block data read from the device is compressed data, and the instructions cause the one or more processors further to:
    decompress, independent from other data in the indexed storage block, the compressed data read from the sub-block; and responsive to the request to read data, transmit the decompressed data as the requested data.

12. The non-transitory computer-readable medium of claim 10, wherein the indexed storage block comprises a plurality of appended sub-blocks, and one or more appended sub-blocks of the plurality of appended sub-blocks are compressed independently from each other.

13. The non-transitory computer-readable medium of claim 12, wherein at least one sub-block of the plurality of appended sub-blocks in the indexed storage block is not compressed.

14. The non-transitory computer-readable medium of claim 10, wherein:
    each sub-block is aligned to start at an address boundary whose value is a multiple of a number of alignment units, N, where N>1; and
    the instructions cause the one or more processors further to:
        determine the start address of a sub-block containing the requested data based on the sub-block start offset and N.

15. The non-transitory computer-readable medium of claim 14, wherein:
    a value for the number of alignment units is stored within each index entry and used only for sub-blocks residing within the indexed storage block; and
    the instructions cause the one or more processor further to:
        retrieve a first number of alignment units, N, from a first index entry;
        responsive to receiving a second request for a second data identifier of second requested data, retrieve a second number of alignment units, M, from a second index entry distinct from the first index entry, wherein N is not the same as M; and
        determine a second start address of a sub-block containing the requested data in response to the second request based on a second sub-block start offset and M.

16. The non-transitory computer-readable medium of claim 10, wherein each index entry includes an identifier of the device on which the indexed storage block is stored.

17. The non-transitory computer-readable medium of claim 10, the instructions causing the one or more processors further to
    retrieve from the determined sub-block locator a sub-block size, wherein the sub-block size is a number of storage units occupied by the sub-block.

18. A non-transitory computer-readable medium of claim 10, wherein the size of each sub-block is stored within the sub-block on the device.

19. A storage management apparatus comprising:
    a cache device or a storage device;
    one or more processors coupled to the cache device or the storage device; and
    a memory coupled to the processor for storing instructions, which when executed by the one or more processors, cause the one or more processors to:
    retrieve, in response to a request from a client to access data, an index entry from an index of storage blocks based on a data identifier of the requested data, wherein the index entry includes a start location of an indexed storage block stored in a device, and information identifying a plurality of sub-block locators,
    wherein each sub-block locator of the plurality of sub-block locators includes a start offset of a sub-block within the indexed storage block;
    determine which sub-block locator, of the plurality of sub-block locators within the index entry, locates a sub-block containing the requested data based on the start location of the indexed storage block and the data identifier of the requested data;
    without reading the entire indexed storage block, read the sub-block from the device starting at a device location determined based on the start location of the indexed storage block within the device and the sub-block start offset of the determined sub-block locator; and
    transmit the requested data read from the sub-block to the client.

20. The storage management apparatus of claim 19, wherein:
    the sub-block data read from the device is compressed data, and the instructions cause the one or more processors further to:
    decompress, independent from other data in the indexed storage block, the compressed data read from the sub-block; and
    responsive to the request to read data, transmit the decompressed data as the requested data.

21. The storage management apparatus of claim 19, wherein at least one sub-block of the plurality of appended sub-blocks in the indexed storage block is not compressed.

22. The storage management apparatus of claim 19, wherein each index entry includes an identifier of the device on which the indexed storage block is stored.

* * * * *